United States Patent
Kim et al.

(10) Patent No.: US 12,521,348 B2
(45) Date of Patent: Jan. 13, 2026

(54) MICROSPHERE PRODUCING SYSTEM AND MICROSPHERE PRODUCING METHOD

(71) Applicant: Inventage Lab Inc., Gyeonggi-do (KR)

(72) Inventors: Ju Hee Kim, Gyeonggi-do (KR); Chan Hee Chon, Gyeonggi-do (KR)

(73) Assignee: Inventage Lab Inc., Gyeonggi-Do (KR)

( * ) Notice: Subject to any disclaimer, the term of this patent is extended or adjusted under 35 U.S.C. 154(b) by 201 days.

(21) Appl. No.: 18/038,535

(22) PCT Filed: Aug. 2, 2021

(86) PCT No.: PCT/KR2021/010078
§ 371 (c)(1),
(2) Date: May 24, 2023

(87) PCT Pub. No.: WO2022/114450
PCT Pub. Date: Jun. 2, 2022

(65) Prior Publication Data
US 2024/0016742 A1    Jan. 18, 2024

(30) Foreign Application Priority Data
Nov. 30, 2020 (KR) .................. 10-2020-0164614

(51) Int. Cl.
   *B29C 64/00*    (2017.01)
   *A61K 9/16*    (2006.01)
(52) U.S. Cl.
   CPC .......... *A61K 9/1682* (2013.01); *A61K 9/1629* (2013.01)

(58) Field of Classification Search
   CPC .......................... A61K 9/1682; A61K 9/1629
   See application file for complete search history.

(56) References Cited

U.S. PATENT DOCUMENTS

| | | | | |
|---|---|---|---|---|
| 5,629,011 A | * | 5/1997 | Illum ................... | A61K 31/485 424/499 |
| 2007/0275082 A1 | * | 11/2007 | Lee ...................... | A61K 9/1647 424/490 |

(Continued)

FOREIGN PATENT DOCUMENTS

| | | |
|---|---|---|
| JP | 2008-202040 A | 9/2008 |
| JP | 2017-523128 A | 8/2017 |

(Continued)

*Primary Examiner* — Nicholas Krasnow
(74) *Attorney, Agent, or Firm* — The PL Law Group, PLLC

(57) ABSTRACT

A system for producing a microsphere includes a first raw material storing to store a first raw material is stored, a second raw material storing part to store a second raw material including a solvent, a biodegradable polymer, and a drug, an emulsion generating part to continuously form an emulsion including the first raw material of a continuous phase and the second raw material of a dispersed phase, a first solvent extracting and removing part to accommodate the emulsion formed from the emulsion generating part, and extract and remove the solvent from the dispersed phase of the emulsion to form a microsphere, and a second solvent extracting and removing part spaced apart from the first solvent extracting and removing part, to accommodate the emulsion formed from the emulsion generating part, and extract and remove the solvent from the dispersed phase of the emulsion to form a microsphere.

5 Claims, 9 Drawing Sheets

(56) References Cited

U.S. PATENT DOCUMENTS

| | | | |
|---|---|---|---|
| 2010/0247663 A1* | 9/2010 | Day .................... | A61K 9/1682 |
| | | | 424/130.1 |
| 2012/0065329 A1* | 3/2012 | Lopez .................. | A61K 47/34 |
| | | | 524/860 |
| 2016/0143851 A1* | 5/2016 | Karavas ............... | A61K 9/1694 |
| | | | 514/259.41 |
| 2018/0133672 A1 | 5/2018 | Kim | |
| 2022/0096498 A1* | 3/2022 | Ugwu .................. | A61K 9/1682 |
| 2023/0149879 A1* | 5/2023 | Jin ....................... | B01J 13/206 |
| | | | 424/450 |
| 2023/0346707 A1* | 11/2023 | Kim ..................... | B01J 2/06 |
| 2024/0016742 A1* | 1/2024 | Kim ..................... | B01F 23/41 |

FOREIGN PATENT DOCUMENTS

| | | |
|---|---|---|
| KR | 10-0681213 B1 | 2/2007 |
| KR | 10-2013-0047232 A | 5/2013 |
| KR | 10-2018-0131077 A | 12/2018 |
| KR | 10-2259589 B1 | 6/2021 |

\* cited by examiner

MICROSPHERE PRODUCING SYSTEM AND MICROSPHERE PRODUCING METHOD

CROSS REFERENCE TO RELATED APPLICATIONS AND CLAIM OF PRIORITY

This application claims benefit under 35 U.S.C. 119, 120, 121, or 365(c), and is a National Stage entry from International Application No. PCT/KR2021/010078 filed on Aug. 2, 2021, which claims priority to the benefit of Korean Patent Application No. 10-10-2020-0164614 filed on Nov. 30, 2020, at the Korean Intellectual Property Office, the disclosures of which are incorporated by reference herein in their entirety.

BACKGROUND

1. Technical Field

The present invention relates to a microsphere producing system and a microsphere producing method, and more particularly, to a microsphere producing system and a microsphere producing method capable of mass-production of microspheres of uniform quality.

2. Background Art

One of the drug delivery systems that are currently being actively researched, developed, and utilized is the so-called Polymeric Drug-Delivery System (PDDS), which controllably releases the fixed amount of a therapeutic agent to both hydrophilic or hydrophobic therapeutic agents in circulating doses over an extended period of time by using biodegradable, biocompatible and non-toxic polymers, for example, polylactic acid (PLA)/polyglycolic (PGA) polymers.

The biodegradable polymer may be prepared in the form of microspheres by various known techniques. In the preparation of these biodegradable polymer microspheres, the most frequently used method is dissolving the biodegradable polymer or the material to be encapsulated with the biodegradable polymer (pharmaceutical or other active agent) in a solvent by using a known method, and dispersing or emulsifying the dissolved polymer in an aqueous solution containing a surfactant. Subsequently, the solvent is removed from the microsphere and dried to obtain a microsphere product. In the microsphere producing process according to the known technology, a toxic solvent, such as dichloromethane or chloroform, is mainly used to dissolve the biodegradable polymer and the active agent, and sufficient time and effort need be devoted to the removal of the solvent so that these solvents do not remain in the microsphere product that is the final product, thereby increasing the time to obtain the microsphere product, and acting as a hindrance to mass-production. Accordingly, efforts have been made to mass-produce high-quality microspheres at low cost.

SUMMARY

The present invention has been made in an effort to solve the problems in the related art, and provides a microsphere producing system capable of mass-producing microspheres of uniform quality.

The present invention has also been made in an effort to solve the problems in the related art, and provides a microsphere producing method capable of mass-producing microspheres of uniform quality.

According to an exemplary embodiment of the inventive concept, a system for producing a microsphere includes a first raw material storing part in which a first raw material is stored, a second raw material storing part in which a second raw material including a solvent, a biodegradable polymer, and a drug is stored, an emulsion generating part configured to continuously form an emulsion including the first raw material of a continuous phase and the second raw material of a dispersed phase, a first solvent extracting and removing part configured to accommodate the emulsion formed from the emulsion generating part, and extract and remove the solvent from the dispersed phase of the emulsion to form a microsphere, and a second solvent extracting and removing part which is spaced apart from the first solvent extracting and removing part, configured to accommodate the emulsion formed from the emulsion generating part, and extract and remove the solvent from the dispersed phase of the emulsion to form a microsphere.

In an exemplary embodiment, the emulsion generating part may include a first flow path in which the first raw material flows, a second flow path in which the second raw material flows, and a third flow path in which the emulsion including the continuous phase and the dispersed phase flows.

In an exemplary embodiment, the emulsion generating part may include a plurality of microchips, and each of the microchips includes the first flow path, the second flow path, and the third flow path.

In an exemplary embodiment, the emulsion generating part may sequentially supply the continuously generated emulsion to the first solvent extracting and removing part and the second solvent extracting and removing part.

In an exemplary embodiment, the system may further include a cleaning part configured to clean the microsphere formed in the first solvent extracting and removing part or the second solvent extracting and removing part by using a cleaning solution.

In an exemplary embodiment, the cleaning part may include a first cleaning part which cleans the microsphere formed in the first solvent extracting and removing part and a second cleaning part which cleans the microsphere formed in the second solvent extracting and removing part. The first cleaning part may be spaced apart from the second cleaning part.

In an exemplary embodiment, the system may further include a drying part configured to dry the microsphere formed in the first solvent extracting and removing part or the second solvent extracting and removing part and obtain microsphere powder.

In an exemplary embodiment, the first raw material may include water and a surfactant, and the solvent of the second raw material is selected from the group consisting of dichloromethane, chloroform, ethyl acetate, acetone, acetonitrile, dimethyl sulfoxide, dimethylformamide, methyl ethyl ketone, acetic acid, methyl alcohol, ethyl alcohol, propyl alcohol, benzyl alcohol, and a mixed solvent thereof.

In an exemplary embodiment, each of the first and second solvent extracting and removing parts may form a fluid flow in the emulsion, extracts the solvent of the second raw material, and evaporates and removes the extracted solvent.

In an exemplary embodiment, each of the first and second solvent extracting and removing parts may vaporize and remove the solvent by heating the emulsion to a boiling point of the solvent or higher.

According to an exemplary embodiment of the inventive concept, a method of producing microspheres includes preparing a first raw material and preparing a second raw material including a biodegradable polymer, a drug, and a solvent, providing the first raw material and the second raw material to an emulsion generating part and continuously forming, by the emulsion generating part, an emulsion including the first raw material of a continuous phase and the second raw material of a dispersed phase, supplying the emulsion generated in the emulsion generating part to a first solvent extracting and removing part and extracting and removing, by the first solvent extracting and removing part, the solvent from the dispersed phase to form a microsphere, and supplying the emulsion generated in the emulsion generating part to a second solvent extracting and removing part which is spaced apart from the first solvent extracting and removing part and extracting and removing, by the second solvent extracting and removing part, the solvent from the dispersed phase to form a microsphere.

In an exemplary embodiment, the emulsion may be sequentially supplied to the second solvent extracting and removing part after being completely supplied to the first solvent extracting and removing part.

In an exemplary embodiment, the method may further include cleaning and drying, or drying the microspheres formed in the first solvent extracting and removing part and obtaining dried microsphere powder.

In an exemplary embodiment, the method may further include after recovering the microspheres formed in the first solvent extracting and removing part, supplying an emulsion newly generated in the emulsion generating part to the first solvent extracting and removing part and extracting and removing, by the first solvent extracting and removing part, the solvent from the second raw material of a dispersed phase of the newly generated emulsion to form a microsphere.

In an exemplary embodiment, the emulsion generating part may include a microchip including a first flow path in which the first raw material flows, a second flow path in which the second raw material flows, and a third flow path in which the emulsion including the continuous phase and the dispersed phase flows.

In an exemplary embodiment, the method may further include cleaning, by a first cleaning part, the microsphere formed in the first solvent extracting and removing part, and cleaning, by a second cleaning part which is spaced apart from the first cleaning part, the microsphere formed in the second solvent extracting and removing part.

According to the exemplary embodiments of the present invention, the microsphere producing system includes the emulsion generating part which continuously forms the emulsion including the first raw material of the continuous phase and the second raw material of the dispersed phase, the first solvent extracting and removing part which accommodates the emulsion formed from the emulsion generating part and forms microspheres by extracting and removing the solvent from the dispersed phase of the emulsion, and the second solvent extracting and removing part which is spaced apart from the first solvent extracting and removing part, accommodates the emulsion formed from the emulsion generating part, and forms microspheres by extracting and removing the solvent from the dispersed phase of the emulsion, so that it is possible to maximize efficiency of the emulsion forming process and the solvent extracting and removing process, and mass-produce the high quality of microspheres at low cost.

However, the effects of the present invention are not limited to the above effects, and may be variously expanded without departing from the spirit and scope of the present invention.

DETAILED DESCRIPTION

Figure 1:
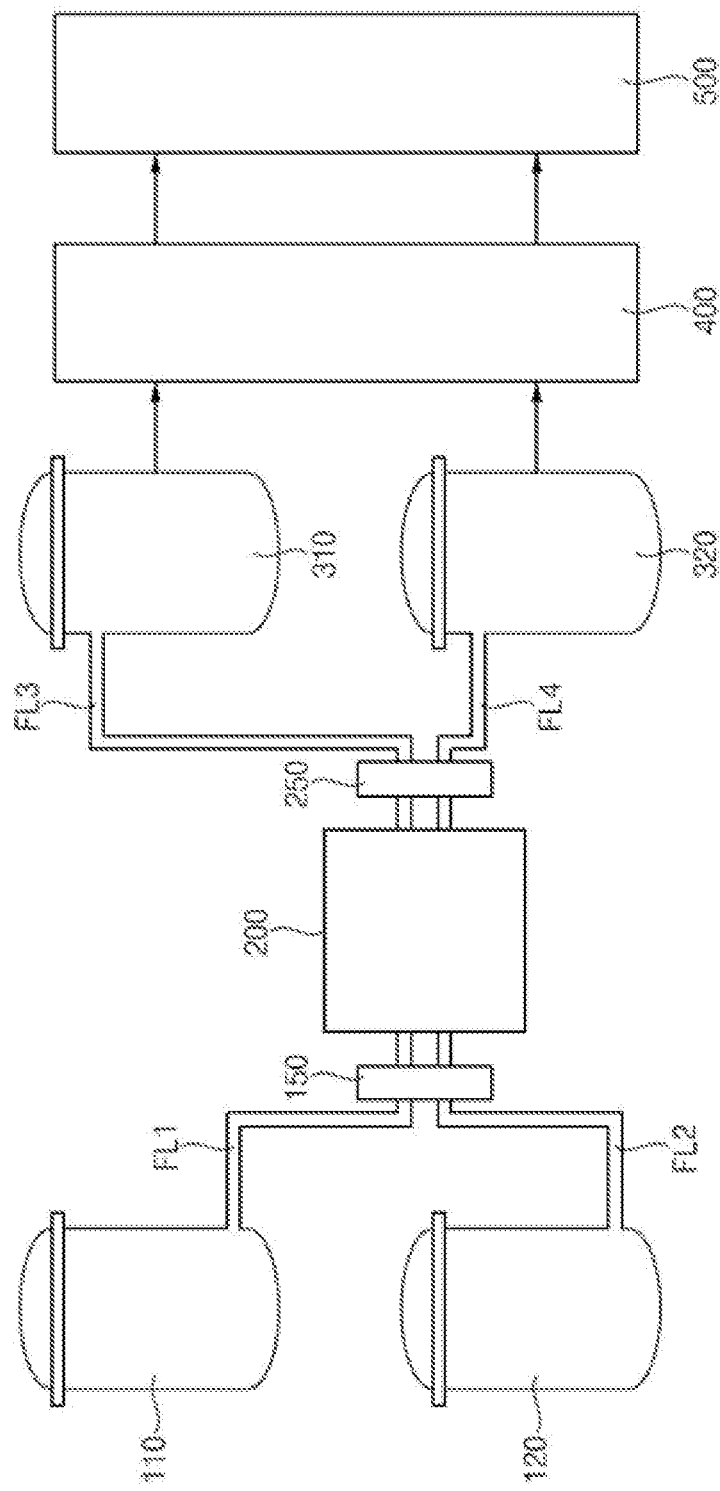
FIG. 1 is a schematic diagram illustrating a microsphere producing system according to an exemplary embodiment of the present invention.

Hereinafter, exemplary embodiments of the present invention will be described in more detail with reference to the drawings.

Since the present invention may have various changes and have various forms, specific exemplary embodiments are illustrated in the drawings and described in detail in the text. However, it is not intended to limit the present invention to the specific disclosed form, and it will be appreciated that the present invention includes all modifications, equivalences, or substitutions included in the spirit and the technical scope of the present invention.

FIG. 1 is a schematic diagram illustrating a microsphere producing system according to an exemplary embodiment of the present invention.

Referring to FIG. 1, the microsphere producing system includes a raw material storing part, an emulsion generating part 200, a solvent extracting and removing part, a cleaning part 400, and a drying part 500.

The raw material storing part may include a first raw material storing part 110 and a second raw material storing part 120. The solvent extracting and removing part may include a first solvent extracting and removing part 310 and a second solvent extracting and removing part 320.

The first raw material storing part 110 may store a first raw material. The first raw material may include purified water and surfactant. For example, the first raw material may be an aqueous solution in which polyvinyl alcohol (PVA) is dissolved as a surfactant in pure water.

The type of the surfactant is not particularly limited, and any biodegradable polymer solution may be used as long as the biodegradable polymer solution can help the forming of a dispersed phase of stable droplets in an aqueous solution phase that is a continuous phase. The surfactant may be preferably selected from the group consisting of methylcellulose, polyvinylpyrrolidone, carboxymethylcellulose, lecithin, gelatin, polyvinyl alcohol, polyoxyethylene sorbitan fatty acid ester, polyoxyethylene castor oil derivatives, and mixtures thereof.

The second raw material storing part 120 may store a second raw material. The second raw material is an oil-phase solution, and may include an organic solvent, a biodegradable polymer dissolved therein, and a drug. The organic solvent is a solvent used to dissolve the biodegradable polymer, and may have water-immiscible properties. The type of organic solvent dissolving the biodegradable polymer is not particularly limited, but may be preferably selected from the group consisting of dichloromethane, chloroform, ethyl acetate, acetone, acetonitrile, dimethyl sulfoxide, dimethylformamide, methyl ethyl ketone, acetic acid, methyl alcohol, ethyl alcohol, propyl alcohol, benzyl alcohol, and a mixed solvent thereof.

The type of the biodegradable polymer is not particularly limited, but polyester may be preferably used, and in particular, the biodegradable polymer may be selected from the group consisting of polylactide, polyglycolide, poly(lactide-co-glycolide), poly(lactide-co-glycolide) glucose, polycaprolactone, and mixtures thereof.

The type of the drug is not particularly limited, and for example, the drug may be selected from antipsychotic drugs, such as dementia treatment drug, Parkinson's disease treatment, anticancer drugs, antianxiety drugs, antidepressants, tranquilizers, and psychotropic drugs; cardiovascular treatment agents, such as hyperlipidemia agents, antihypertensive agents, hypotensive agents, antithrombotic agents, vasodilators, and arrhythmias; gastrointestinal treatment agents, such as epilepsy treatment agent and anti-ulcer agent; hormonal drugs, such as rheumatoid treatment agent; antispasmodics; tuberculosis treatment agent; muscle relaxants agent; osteoporosis treatment agent; erectile dysfunction treatment agent; styptic; and sex hormones; diabetes treatment agent; antibiotic; antifungal agents; antiviral agents; antipyretic analgesic and anti-inflammatory agent; autonomic drug; corticosteroids; diuretics; antidiuretics; painkiller; anesthetic; antihistamines; antiprotozoal; anti-anemia agent; anti-asthma agent; antispasmodics; antidote; antimigraine; antiemetic; anti-Parkinson's drugs; antiepileptic drugs; antiplatelet agents; antitussive expectorant; bronchodilator; cardiotonic; immunomodulators; protein drugs; gene drugs; and mixtures thereof.

The foregoing kind of the drug is not particularly limited, and preferably, the drug may be selected from the group consisting of donepezil, memantine, rivastigmine, entecavir, lamivudine, rotigotine, ropinirole, bupivacaine, ropivacaine, meloxicam, buprenorphine, fentanyl, nimodipine, granisetron, triamcinolone, cytarabine, carmustine, tamsoleucine, polmacoxib, testosterone, estradiol, risperidone, paliperidone, olanzapine, aripiprazole, goserelin, leuprolide, tryptorelin, buserellin, naparelin, deslorrelin, octreotide, pasireotide, lanreotide, vapretide, exenatide, liraglutide, lixisenatide, semaglutide, salts thereof, and mixtures thereof.

The emulsion generating part 200 may receive the first raw material and the second raw material from the first raw material storing part 110 and the second raw material storing part 120. The emulsion including the first raw material of the continuous phase and the second raw material of the dispersed phase may be continuously formed by using the first raw material and the second raw material.

According to the present exemplary embodiment, the emulsion generating part 200 may form the emulsion by a continuous process, not in the unit of a batch process. That is, the emulsion generating part 200 may continuously receive the first raw material and the second raw material, and continuously form the emulsion. For example, the emulsion generating part 200 may include a microchip including a first flow path in which the first raw material flows, a second flow path in which the second raw material flows, and a third flow path in which the emulsion including the continuous phase and the dispersed phase flows, and the plurality of microchips is connected in parallel to continuously form the desired amount of emulsion (the particular principle of the microchip will be described below with reference to FIG. 9).

According to another exemplary embodiment, the emulsion generating part 200 may also include a configuration in which a plurality of tanks forming the emulsion by mixing the first raw material and the second raw material sequentially forms the emulsion. For example, the continuous forming of the emulsion is possible even in the case where the emulsion is formed by a mixing method in which the first and second raw materials are supplied to a second tank while the emulsion is formed in a first tank by a mixing method, and the first and second raw materials are supplied again to a third tank or the first tank in which the forming of the emulsion has been finished and the microsphere has been recovered while the emulsion is formed in the second tank to form the emulsion again.

The first raw material storing part 110 and the emulsion generating part 200 are connected by a first connection path FL1, so that the first raw material may be continuously supplied from the first raw material storing part 110 to the emulsion generating part 200. The second raw material storing part 120 and the emulsion generating part 200 are connected by a second connection path FL2, so that the second raw material may be continuously supplied from the second raw material storing part 1120 to the emulsion generating part 200.

A raw material supply adjusting part 150 is formed in the first connection path FL1 and the second connection path FL2, so that the amount of first raw material and the second raw material required by the emulsion generating part 200 may be appropriately adjusted and supplied.

The first solvent extracting and removing part 310 may receive the emulsion formed from the emulsion generating part 200 and accommodate the received emulsion, and extract and remove the solvent from the dispersed phase of the emulsion to form a microsphere. The first solvent extracting and removing part 310 may include a tank for accommodating the emulsion, a stirrer for stirring the emulsion, and a heater for heating the emulsion.

In particular, when the emulsion is maintained or stirred at a temperature below the boiling point of the organic solvent for a predetermined period of time, for example, 2 to 48 hours, the organic solvent may be extracted in the continuous phase from the biodegradable polymer solution in the form of droplets, which is the dispersed phase in the first solvent extracting and removing part 310. A part of the organic solvent extracted in the continuous phase may be evaporated from a surface. As the organic solvent is extracted and evaporated from the biodegradable polymer solution in the form of droplets, the dispersed phase in the form of droplets may be solidified to form a microsphere. In this case, the extraction and the evaporation may be accelerated by making the emulsion flow or heating the emulsion. For example, by forming a fluid flow in the emulsion, the solvent of the second raw material may be extracted and the extracted solvent may be removed by evaporating the extracted solvent. By heating the emulsion at the temperature of the boiling point of the solvent or higher, the solvent may be vaporized and removed. The organic solvent in the dispersed phase may be sufficiently extracted and evaporated in the continuous phase by removing the part of the continuous phase including the organic solvent extracted from the dispersed phase and supplying a new aqueous solution that may replace the removed continuous phase. In this case, the new aqueous solution may optionally further contain a surfactant.

The second solvent extracting and removing part 320 may receive the emulsion formed from the emulsion generating part 200 and accommodate the received emulsion, and extract and remove the solvent from the dispersed phase of the emulsion to form a microsphere.

The second solvent extracting and removing part 320 is a separate configuration spaced apart from the first solvent extracting and removing part 310, so that the particular function and constituent element may substantially be the same as those of the first solvent extracting and removing part 310.

The first solvent extracting and removing part 310 and the emulsion generating part 200 may be connected by a third connection path FL3. The second solvent extracting and removing part 320 and the emulsion generating part 200 may be connected by a fourth connection path FL4.

An emulsion supply adjusting part 250 is formed in the third connection path FL3 and the fourth connection path FL4, so that the emulsion may be selectively supplied to the first solvent extracting and removing part 310 or the second solvent extracting and removing part 320 as needed.

The cleaning part 400 may recover the microspheres formed from the first solvent extracting and removing part 310 or the second solvent extracting and removing part 320 and clean the microspheres. The method of recovering the microspheres from the continuous phase including the microspheres formed from the first or second solvent extracting and removing part 310 or 320 and cleaning the recovered microspheres is not particularly limited, and the microspheres may be recovered by using methods, such as filtration or centrifugation, and cleaned by using water. Through this, the remaining organic solvent and surfactant (for example, polyvinyl alcohol) may be removed. The cleaning operation may be typically performed by using water, and the cleaning operation may be repeated several times.

The drying part 500 may dry the cleaned microspheres to obtain microsphere powder. After the filtering and cleaning operation, the obtained microspheres are dried by using a general drying method to finally obtain the dried microsphere powder. The method of drying the microsphere is not limited. However, the used drying method is not particularly limited, and the drying may be performed by using freeze drying, vacuum drying, or reduced pressure drying. In the meantime, the cleaning part 400 is illustrated as a separate configuration from the first or second solvent extracting and removing part 310 or 320, but may be integrally formed with the first or second solvent extracting and removing part 310 or 320 inside the first or second solvent extracting and removing part 310 or 320, so that the cleaning operation of the cleaning part 400 may also be performed within the first or second solvent extracting and removing part 310 or 320.

Through the drying process of the microspheres, a final desired monodisperse biodegradable polymer-based microsphere powder is prepared, and then, a final product may be obtained by suspending the obtained microsphere powder in a suspension and filling an appropriate container, for example, a disposable syringe, with the suspended microsphere powder.

Figure 2:
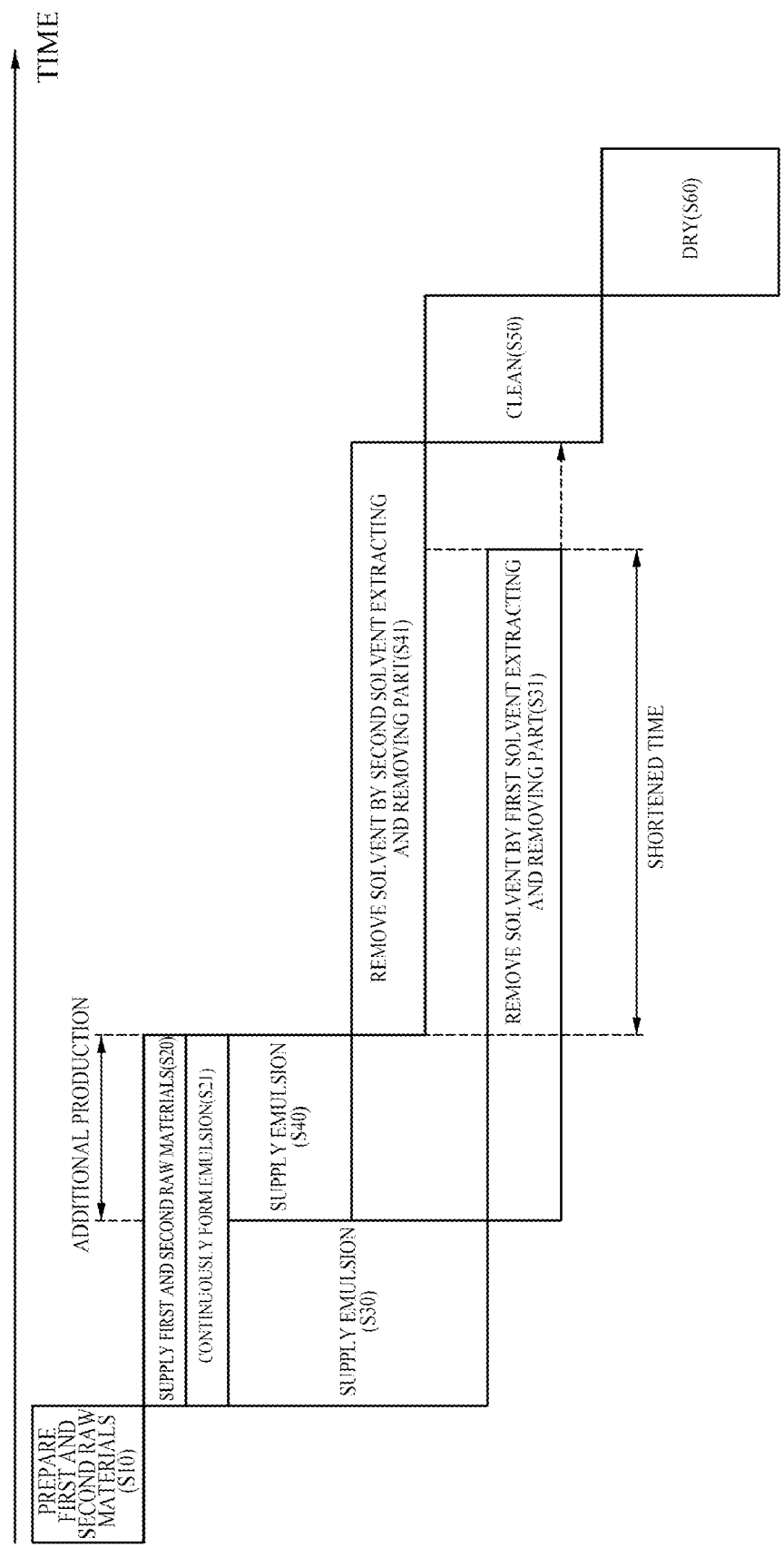
FIG. 2 is a diagram for describing a microsphere producing method by using the microsphere producing system of FIG. 1.

FIG. 2 is a diagram for describing a microsphere producing method by using the microsphere producing system of FIG. 1. In the drawing, the horizontal axis is the time axis, and indicates a duration time of a corresponding operation.

Referring to FIGS. 1 and 2, a first raw material and a second raw material are prepared (S10). The first raw material may be stored in the first raw material storing part 110, and the second raw material may be stored in the second raw material storing part 120.

The first raw material and the second raw material are supplied to the emulsion generating part 200 (S20). The first raw material and the second raw material supplied from the first and second raw material storing parts 110 and 120 may be continuously supplied to the emulsion generating part 200.

The emulsion generating part 200 continuously forms an emulsion (S21). The emulsion generating part 200 may continuously form the emulsion by using the first and second raw materials continuously supplied from the first and second raw material storing parts 110 and 120.

The initially formed emulsion is supplied to the first solvent extracting and removing part 310 (S30). Then, the first solvent extracting and removing part 310 extracts and removes a solvent of a dispersed phase of the emulsion (S31).

The emulsion formed later is supplied to the second solvent extracting and removing part 320 (S40). Then, the second solvent extracting and removing part 320 extracts and removes the solvent of the dispersed phase of the emulsion (S41).

Microspheres formed by removing the solvent by the first and second solvent extracting and removing parts 310 and 320 may be finally obtained as microsphere powder through a cleaning operation S50 and a drying operation S60.

According to the present exemplary embodiment, even after the emulsion to be supplied to the first solvent extracting and removing part 310 is formed, the emulsion generating part 200 continuously forms an emulsion and the emulsion may be provided to the second solvent extracting and removing part 320 that is separate from the first solvent extracting and removing part 310. That is, the "additional production" portion on the drawings may be produced more than the conventional batch size, thereby enabling mass production.

Further, the processes for extracting and removing the solvent that are the long-time consuming processes in producing the microsphere, that is, operation S310 and operation S41, are performed in the separate configurations, and are simultaneously performed by "shortened time" in the drawing, so that the time for further processing the "additional production" portion may be shortened, and efficiency of the emulsion forming process and the solvent extracting and removing process may be maximized. Through this, the microsphere of high quality may be mass produced. In particular, compared to the conventional producing technology based on the batch process, it is possible to produce more microspheres in the same process equipment size, and accordingly, the load on washing, sterilization, and quality control (QC) that need to be performed for each bath is reduced, and as a result, high-quality of microspheres may be mass produced with low cost.

Figure 3:
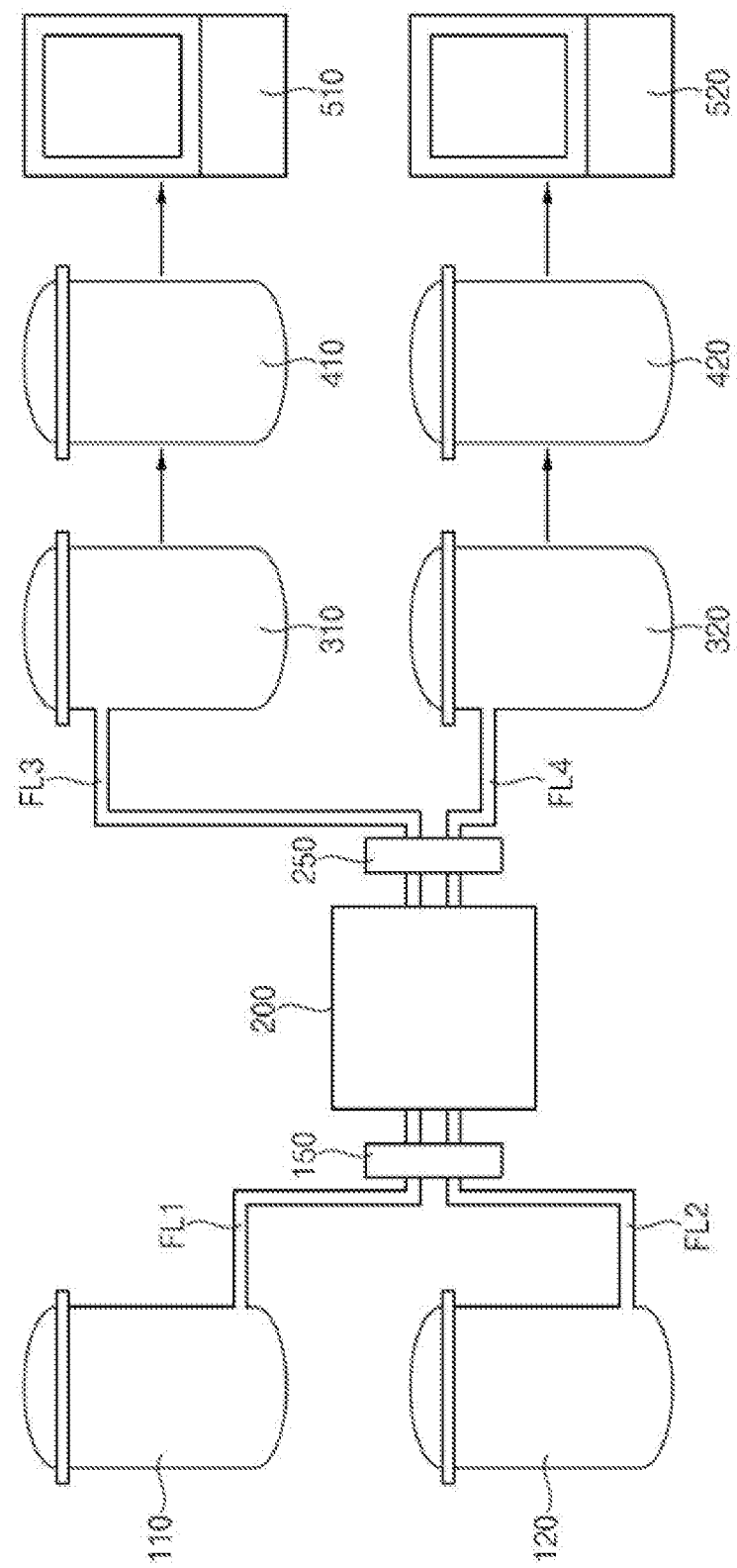
FIG. 3 is a schematic diagram illustrating a microsphere producing system according to an exemplary embodiment of the present invention.

FIG. 3 is a schematic diagram illustrating a microsphere producing system according to an exemplary embodiment of the present invention.

Referring to FIG. 3, the microsphere producing system includes a raw material storing part, an emulsion generating part 200, a solvent extracting and removing part, a cleaning part, and a drying part. The raw material storing part may include a first raw material storing part 110 and a second raw material storing part 120. The solvent extracting and removing part may include a first solvent extracting and removing part 310 and a second solvent extracting and removing part 320. The cleaning part may include a first cleaning part 410 and a second cleaning part 420. The drying part may include a first drying part 510 and a second drying part 520.

The microsphere producing system is substantially the same as the microsphere producing system of FIG. 1 except that the cleaning part includes the first cleaning part 410 and the second cleaning part 420 spaced apart from the first cleaning part 410, and the drying part includes the first drying part 510 and the second drying part 520 spaced apart from the first drying part 510. Therefore, the repeated description will be omitted.

The first cleaning part 410 may recover the microspheres formed from the first solvent extracting and removing part 310 and clean the recovered microspheres. The second cleaning part 420 may recover the microspheres formed from the second solvent extracting and removing part 320 and clean the recovered microspheres. The second cleaning part 420 is the separate configuration spaced apart from the first cleaning part 410, so that the particular function and constituent element thereof may be substantially the same as those of the first cleaning part 410.

The first drying part 510 may obtain microsphere powder by drying the microspheres cleaned in the first cleaning part 410. The second drying part 520 may obtain microsphere powder by drying the microspheres cleaned in the second cleaning part 420. The second drying part 520 is the separate configuration spaced apart from the first drying part 510, so that the particular function and constituent element thereof may be substantially the same as those of the first drying part 510.

Figure 4:
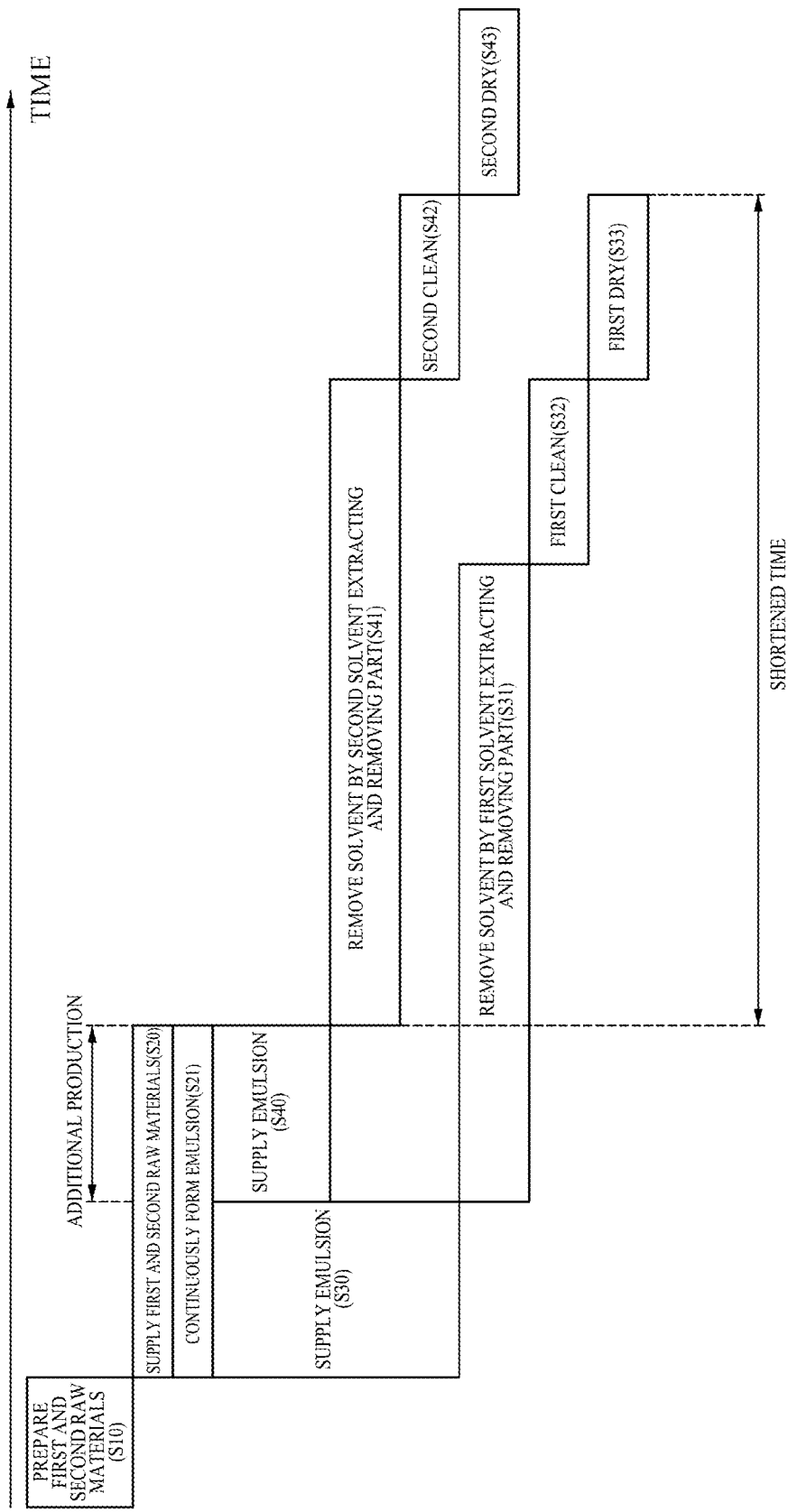
FIG. 4 is a diagram for describing a microsphere producing method by using the microsphere producing system of FIG. 3.

FIG. 4 is a diagram for describing a microsphere producing method by using the microsphere producing system of FIG. 3.

Referring to FIGS. 3 and 4, a first raw material and a second raw material are prepared (S10). The first raw material may be stored in the first raw material storing part 110, and the second raw material may be stored in the second raw material storing part 120.

The first raw material and the second raw material are supplied to the emulsion generating part 200 (S20). The first raw material and the second raw material supplied from the first and second raw material storing parts 110 and 120 may be continuously supplied to the emulsion generating part 200.

The emulsion generating part 200 continuously forms an emulsion (S21). The emulsion generating part 200 may continuously form the emulsion by using the first and second raw materials continuously supplied from the first and second raw material storing parts 110 and 120.

The initially formed emulsion is supplied to the first solvent extracting and removing part 310 (S30). Then, the first solvent extracting and removing part 310 extracts and removes a solvent of a dispersed phase of the emulsion (S31).

The emulsion formed later is supplied to the second solvent extracting and removing part 320 (S40). Then, the second solvent extracting and removing part 320 extracts and removes the solvent of the dispersed phase of the emulsion (S41).

The microspheres formed by removing the solvent in the first solvent extracting and removing part 310 undergo the cleaning operation S32 in the first cleaning part 410, and undergo the drying operation S33 in the first drying part 510, so that the microsphere powder may be finally obtained.

The microspheres formed by removing the solvent in the second solvent extracting and removing part 320 undergo the cleaning operation S42 in the second cleaning part 420, and undergo the drying operation S43 in the second drying part 520, so that the microsphere powder may be finally obtained.

According to the present exemplary embodiment, even after the emulsion to be supplied to the first solvent extracting and removing part 310 is formed, the emulsion generating part 200 continuously forms an emulsion and the emulsion may be provided to the second solvent extracting and removing part 320 that is separate from the first solvent extracting and removing part 310. That is, the 'additional production' portion on the drawings may be produced more than the conventional batch size, thereby enabling mass production.

Further, the processes for extracting and removing the solvent that are the long-time consuming processes in producing the microsphere, that is, operation S31 and operation S41, are performed in the separate configurations, and the cleaning and the drying are individually performed (S32 and S42, S33 and S43), so that the processes are simultaneously performed by "shortened time" in the drawing, and thus, the time for further processing the "additional production" portion may be shortened, and efficiency of the emulsion forming process and the solvent extracting and removing process may be maximized. Through this, the microsphere of high quality may be mass produced.

Figure 5:
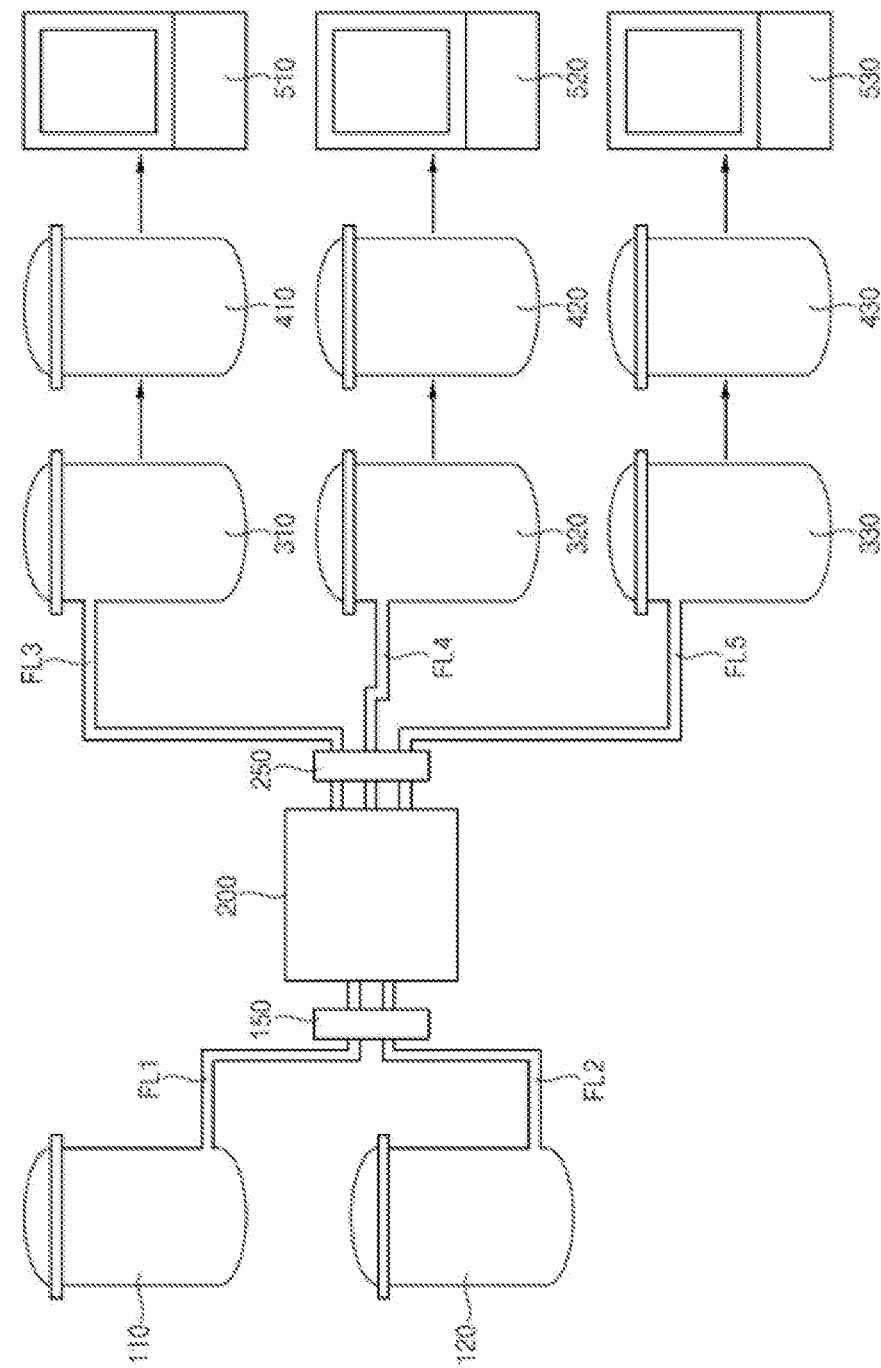
FIG. 5 is a schematic diagram illustrating a microsphere producing system according to an exemplary embodiment of the present invention.

FIG. 5 is a schematic diagram illustrating a microsphere producing system according to an exemplary embodiment of the present invention.

Referring to FIG. 5, the microsphere producing system includes a raw material storing part, an emulsion generating part 200, a solvent extracting and removing part, a cleaning part, and a drying part. The raw material storing part may include a first raw material storing part 110 and a second raw material storing part 120. The solvent extracting and removing part may include a first solvent extracting and removing part 310, a second solvent extracting and removing part 320, and a third solvent extracting and removing part 330. The cleaning part may include a first cleaning part 410, a second cleaning part 420, and a third cleaning part 430. The drying part may include a first drying part 510, a second drying part 520, and a third drying part 530.

The microsphere producing system is substantially the same as the microsphere producing system of FIG. 3 except that the solvent extracting and removing part further includes the third solvent extracting and removing part 330, the cleaning part further includes the third cleaning part 430, and the drying part further includes the third drying part 530. Therefore, the repeated description will be omitted.

The third solvent extracting and removing part 330 may receive the emulsion formed from the emulsion generating part 200 and accommodate the received emulsion, and extract and remove the solvent from the disperse phase of the emulsion to form a microsphere. The third solvent extracting and removing part 330 and the emulsion generating part 200 may be connected by a fifth connection path FL5.

The third solvent extracting and removing part 330 is the separate configuration spaced apart from the first and second solvent extracting and removing parts 310 and 320, so that the particular function and constituent element thereof may be substantially the same as those of the first solvent extracting and removing part 320 or the second solvent extracting and removing part 330.

The third cleaning part 430 may recover the microspheres formed from the third solvent extracting and removing part 330 and clean the recovered microspheres. The third cleaning part 430 is the separate configuration spaced apart from the first and second cleaning parts 410 and 420, so that the particular function and constituent element thereof may be substantially the same as those of the first cleaning part 410 or the second cleaning part 420.

The third drying part 530 may obtain microsphere powder by drying the microspheres cleaned in the third cleaning part 430. The third drying part 530 is the separate configuration spaced apart from the first and second drying parts 510 and 520, so that the particular function and constituent element thereof may be substantially the same as those of the first drying part 510 or the second drying part 520.

An emulsion supply adjusting part 250 is formed in a third connection path FL3, a fourth connection path FL4, and the fifth connection path FL5, so that the emulsion may be selectively supplied to the first solvent extracting and removing part 310, the second solvent extracting and removing part 320, or the third solvent extracting and removing part 330 as needed.

Figure 6:
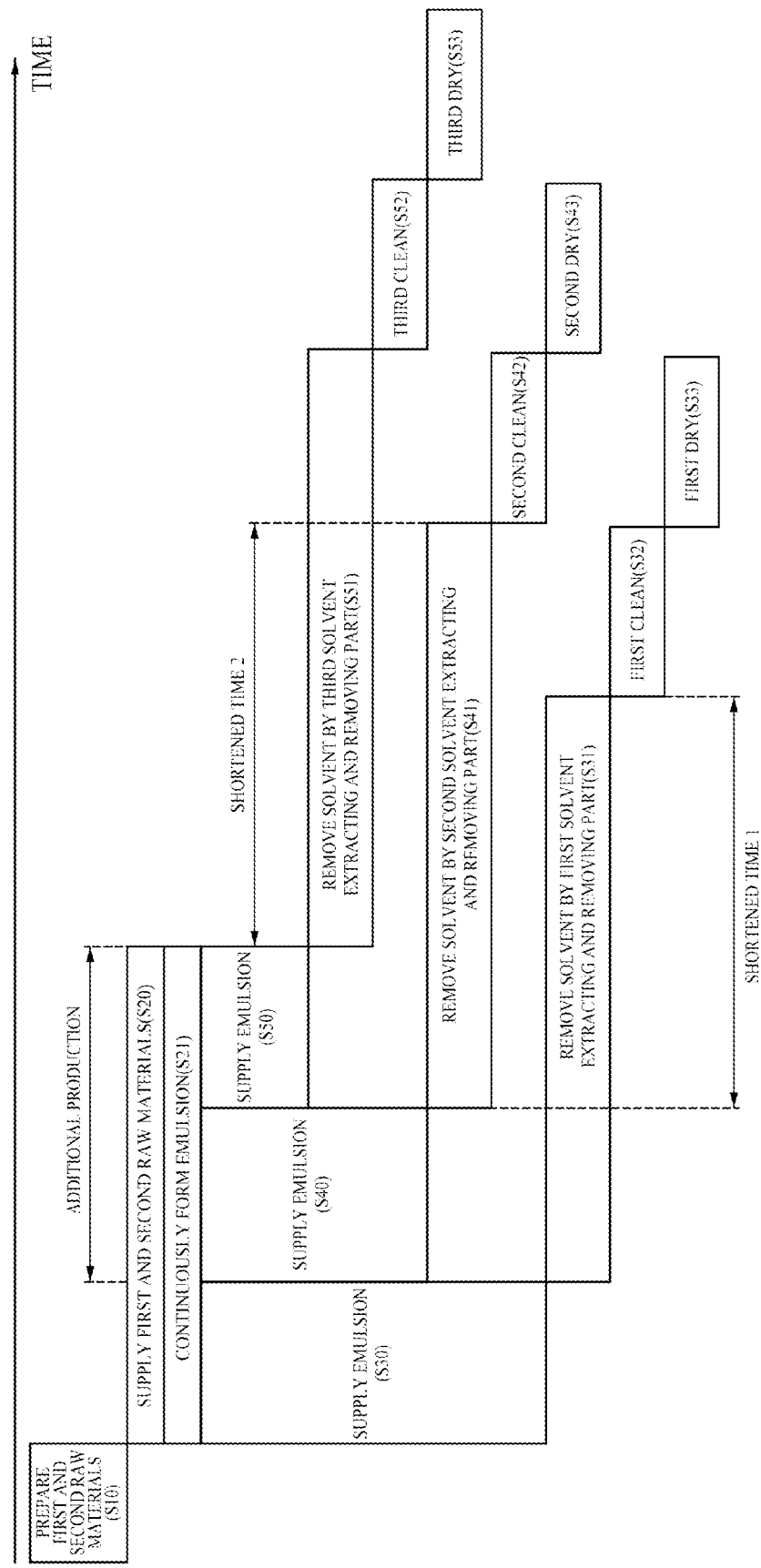
FIG. 6 is a diagram for describing a microsphere producing method by using the microsphere producing system of FIG. 5.

FIG. 6 is a diagram for describing a microsphere producing method by using the microsphere producing system of FIG. 5.

Referring to FIGS. 5 and 6, a first raw material and a second raw material are prepared (S10). The first raw material may be stored in the first raw material storing part 110, and the second raw material may be stored in the second raw material storing part 120.

The first raw material and the second raw material are supplied to the emulsion generating part 200 (S20). The first raw material and the second raw material supplied from the first and second raw material storing parts 110 and 120 may be continuously supplied to the emulsion generating part 200.

The emulsion generating part 200 continuously forms an emulsion (S21). The emulsion generating part 200 may continuously form the emulsion by using the first and second raw materials continuously supplied from the first and second raw material storing parts 110 and 120.

The initially formed emulsion is supplied to the first solvent extracting and removing part 310 (S30). Then, the first solvent extracting and removing part 310 extracts and removes a solvent of a dispersed phase of the emulsion (S31).

The emulsion formed in the middle stage is supplied to the second solvent extracting and removing part 320 (S40). Then, the second solvent extracting and removing part 320 extracts and removes the solvent of the dispersed phase of the emulsion (S41).

The emulsion formed later is supplied to the third solvent extracting and removing part 330 (S50). Then, the third solvent extracting and removing part 330 extracts and removes the solvent of the dispersed phase of the emulsion (S51).

The microspheres formed by removing the solvent in the first solvent extracting and removing part 310 undergo the cleaning operation S32 in the first cleaning part 410, and undergo the drying operation S33 in the first drying part 510, so that the microsphere powder may be finally obtained.

The microspheres formed by removing the solvent in the second solvent extracting and removing part 320 undergo the cleaning operation S42 in the second cleaning part 420, and undergo the drying operation S43 in the second drying part 520, so that the microsphere powder may be finally obtained.

The microspheres formed by removing the solvent in the third solvent extracting and removing part 330 undergo the cleaning operation S52 in the third cleaning part 430, and undergo the drying operation S53 in the third drying part 530, so that the microsphere powder may be finally obtained.

According to the present exemplary embodiment, even after the emulsion to be supplied to the first solvent extracting and removing part 310 is formed, the emulsion generating part 200 continuously forms an emulsion and the emulsion may be provided to the second or third solvent extracting and removing part 320 or 330 that is separate from the first solvent extracting and removing part 310. That is, the 'additional production' portion on the drawings may be produced more than the conventional batch size, thereby enabling mass production.

Further, the processes for extracting and removing the solvent that are the long-time consuming processes in producing the microsphere, that is, operation S31, operation S41, and operation S51, are performed in the separate configurations, so that the processes are simultaneously performed by "shortened time 1" and "shortened time 2", and thus, the time for further processing the "additional production" portion may be shortened, and efficiency of the emulsion forming process and the solvent extracting and removing process may be maximized. Through this, the microsphere of high quality may be mass produced.

Figure 7:
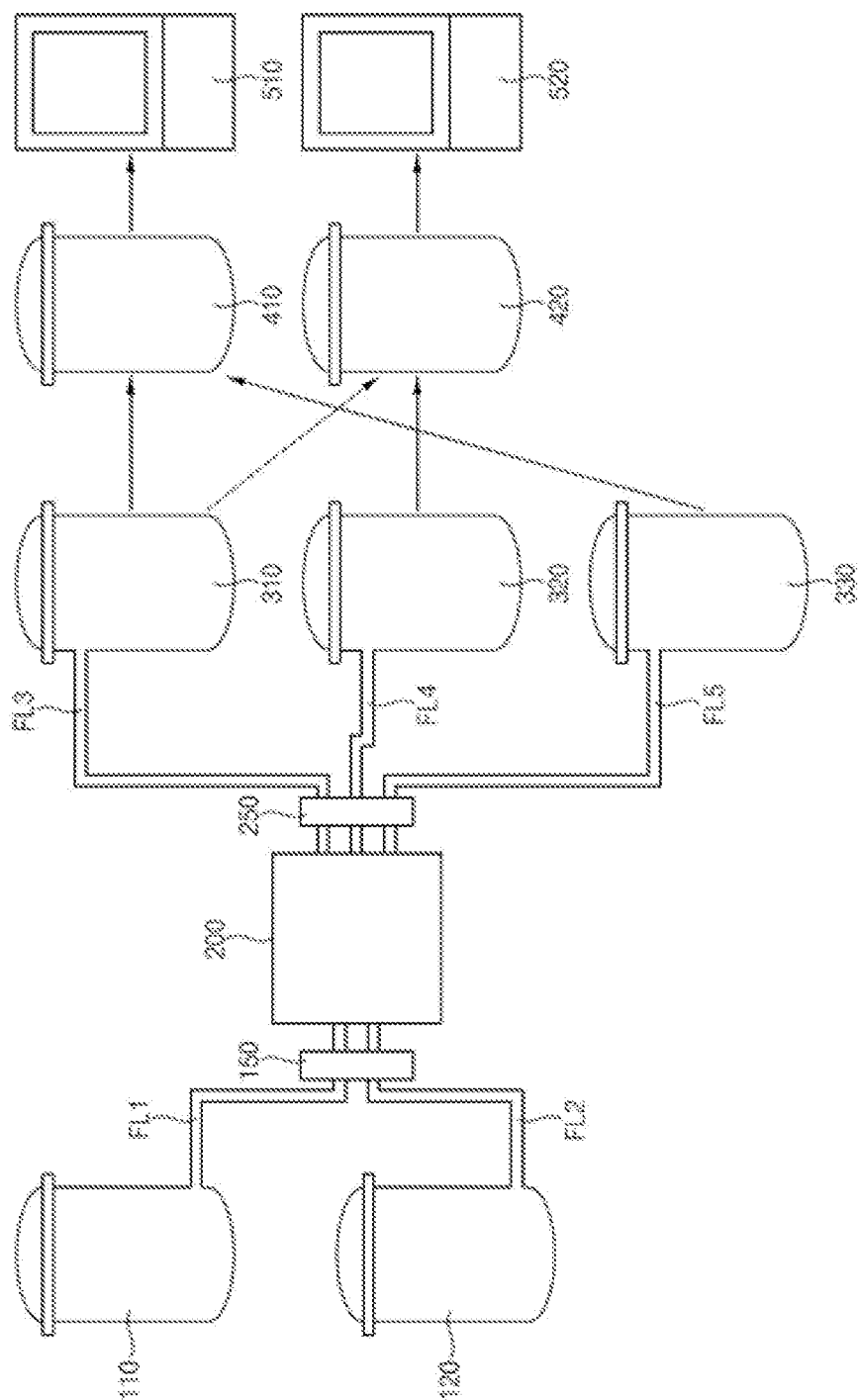
FIG. 7 is a schematic diagram illustrating a microsphere producing system according to an exemplary embodiment of the present invention.

FIG. 7 is a schematic diagram illustrating a microsphere producing system according to an exemplary embodiment of the present invention.

Referring to FIG. 7, the microsphere producing system includes a raw material storing part, an emulsion generating part 200, a solvent extracting and removing part, a cleaning part, and a drying part. The raw material storing part may include a first raw material storing part 110 and a second raw material storing part 120. The solvent extracting and removing part may include a first solvent extracting and removing part 310, a second solvent extracting and removing part 320, and a third solvent extracting and removing part 330. The cleaning part may include a first cleaning part 410 and a second cleaning part 420. The drying part may include a first drying part 510 and a second drying part 520.

The microsphere producing system is substantially the same as the microsphere producing system of FIG. 3 except that the solvent extracting and removing part further includes the third solvent extracting and removing part 330. Therefore, the repeated description will be omitted.

The third solvent extracting and removing part 330 may receive the emulsion formed from the emulsion generating part 200 and accommodate the received emulsion, and extract and remove the solvent from the disperse phase of the emulsion to form a microsphere. The third solvent extracting and removing part 330 and the emulsion generating part 200 may be connected by a fifth connection path FL5.

The third solvent extracting and removing part 330 is the separate configuration spaced apart from the first and second solvent extracting and removing parts 310 and 320, so that the particular function and constituent element thereof may be substantially the same as those of the first solvent extracting and removing part 320 or the second solvent extracting and removing part 330.

In the present exemplary embodiment, the number of solvent extracting and removing parts is three and each of the numbers of cleaning parts and drying parts is two, but producing efficiency may be maximized by configuring only three solvent extracting and removing parts requiring a relatively long time and alternatively using the cleaning parts or the drying parts for which the operation is completed properly. Further, producing efficiency may be maximized by alternatively using the solvent extracting and removing part for which the operation is completed. This will be described below with reference to FIG. 8.

Figure 8:
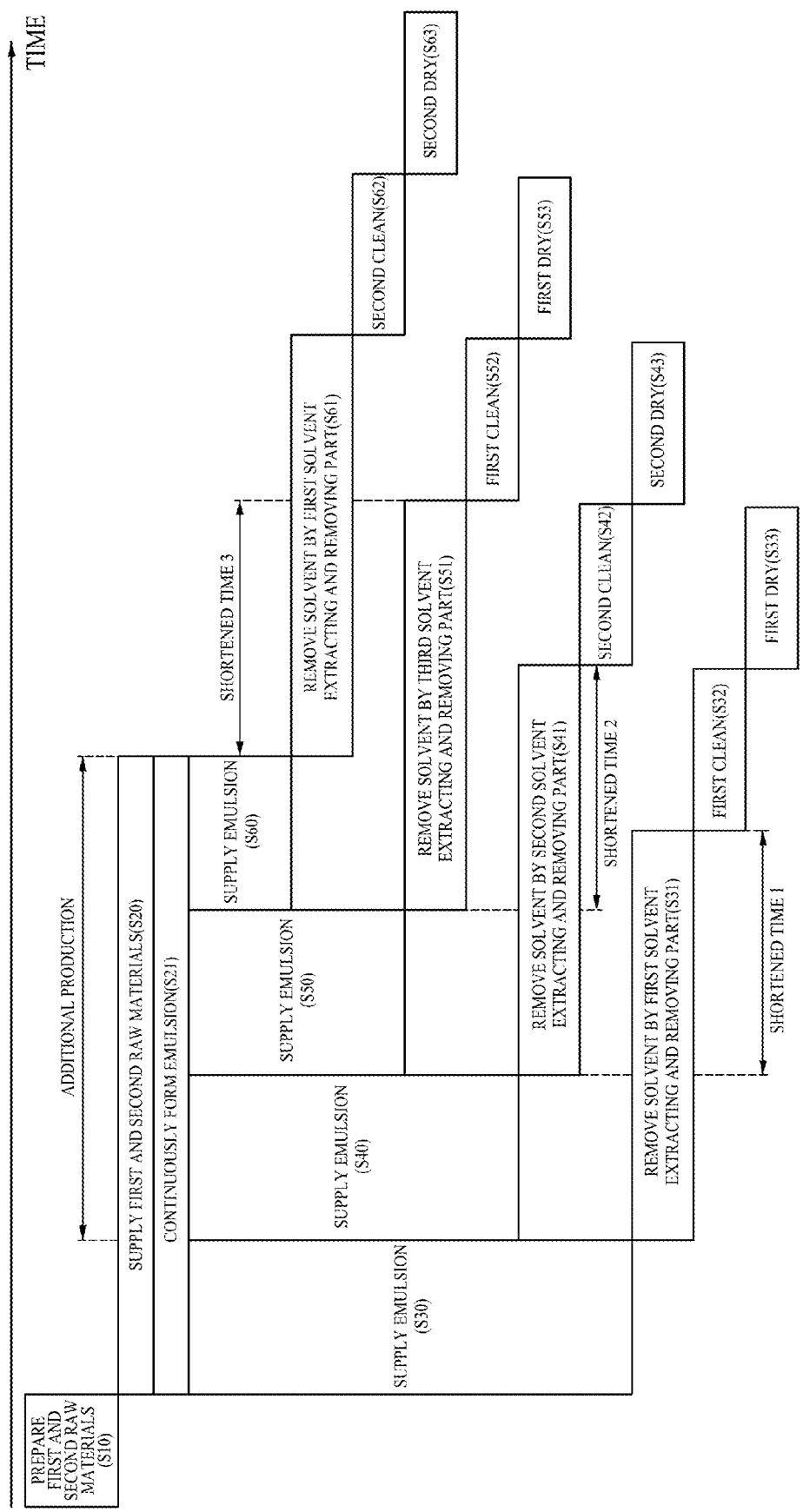
FIG. 8 is a diagram for describing a microsphere producing method by using the microsphere producing system of FIG. 7.

FIG. 8 is a diagram for describing a microsphere producing method by using the microsphere producing system of FIG. 7.

Referring to FIGS. 7 and 8, a first raw material and a second raw material are prepared (S10). The first raw material may be stored in the first raw material storing part 110, and the second raw material may be stored in the second raw material storing part 120.

The first raw material and the second raw material are supplied to the emulsion generating part 200 (S20). The first raw material and the second raw material supplied from the first and second raw material storing parts 110 and 120 may be continuously supplied to the emulsion generating part 200.

The emulsion generating part 200 continuously forms an emulsion (S21). The emulsion generating part 200 may continuously form the emulsion by using the first and second raw materials continuously supplied from the first and second raw material storing parts 110 and 120.

The emulsion formed in a first phase is supplied to the first solvent extracting and removing part 310 (S30). Then, the first solvent extracting and removing part 310 extracts and removes a solvent of a dispersed phase of the emulsion (S31).

The emulsion formed in a second phase is supplied to the second solvent extracting and removing part 320 (S40). Then, the second solvent extracting and removing part 320 extracts and removes the solvent of the dispersed phase of the emulsion (S41).

The emulsion formed in a third phase is supplied to the third solvent extracting and removing part 330 (S50). Then, the third solvent extracting and removing part 330 extracts and removes the solvent of the dispersed phase of the emulsion (S51).

In this case, the microspheres formed by removing the solvent in the first solvent extracting and removing part 310 undergo the cleaning operation S32 in the first cleaning part 410. Accordingly, the first solvent extracting and removing part 310 may be in a ready state to receive the emulsion again, and extract and remove the solvent.

The emulsion formed in a fourth phase is supplied to the third solvent extracting and removing part 330 again (S60). Then, the first solvent extracting and removing part 310 extracts and removes a solvent of a dispersed phase of the emulsion (S61).

The microspheres formed by removing the solvent in the first solvent extracting and removing part 310 undergo the cleaning operation S32 in the first cleaning part 410, and undergo the drying operation S33 in the first drying part 510, so that the microsphere powder may be finally obtained.

The microspheres formed by removing the solvent in the second solvent extracting and removing part 320 undergo the cleaning operation S42 in the second cleaning part 420, and undergo the drying operation S43 in the second drying part 520, so that the microsphere powder may be finally obtained.

The microspheres formed by removing the solvent in the third solvent extracting and removing part 330 undergo the cleaning operation S52 in the first cleaning part 410, and undergo the drying operation S53 in the first drying part 510, so that the microsphere powder may be finally obtained. In this case, since the first cleaning part 410 and the first drying part 510 have already completely cleaned and dried the microspheres supplied from the first solvent extracting and removing part 310, the first cleaning part 410 and the first drying part 510 are ready to receive the microspheres from the third solvent extracting and removing part 330 again.

In the meantime, the microspheres formed by removing the solvent in the first solvent extracting and removing part 310, which was performed secondly, undergo the cleaning operation S62 in the second cleaning part 420 and undergo the drying operation S63 in the second drying part 520 to finally obtain microsphere powder. In this case, since the second cleaning part 420 and the second drying part 520 have already completely cleaned and dried the microspheres supplied from the second solvent extracting and removing part 320, the second cleaning part 420 and the second drying part 520 are ready to receive the microspheres from the first solvent extracting and removing part 310 again.

According to the present exemplary embodiment, even after the emulsion to be supplied to the first solvent extracting and removing part 310 is formed, the emulsion generating part 200 continuously forms an emulsion to provide the formed emulsion to a subsequent process. That is, the 'additional production' portion on the drawings may be produced more than the conventional batch size, thereby enabling mass production. The example has been described in which the first solvent extracting and removing part 310 is used twice, and each of the first and second cleaning parts 410 and 420 and each of the first and second drying parts 510 and 520 are used twice, but the present invention is not limited thereto. That is, in the same way, the emulsion is continuously formed and each configuration for which the operation has been completed is continuously and repeatedly used, so that a desired amount of microspheres may be obtained.

Further, the processes for extracting and removing the solvent that are the long-time consuming processes in producing the microsphere are performed in the separate configurations, and thus the processes are simultaneously performed by "shortened time 1", "shortened time 2", and "shortened time 3", and thus, the time for further processing the "additional production" portion may be shortened, and efficiency of the emulsion forming process and the solvent extracting and removing process may be maximized. Through this, the microsphere of high quality may be mass produced.

Figure 9:
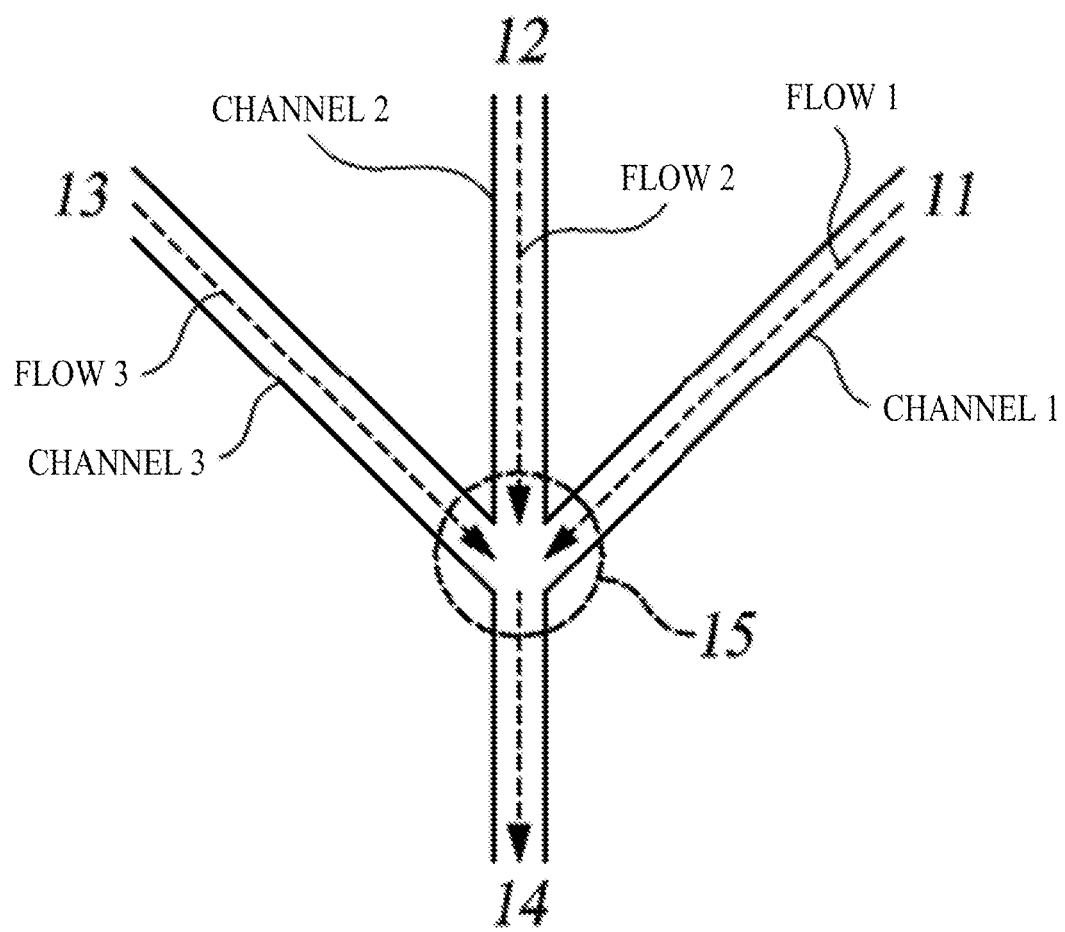
FIG. 9 is a schematic diagram illustrating a microchip of an emulsion generating part of the microsphere producing system according to the exemplary embodiment of the present invention and a flow formed inside the microchip.

FIG. 9 is a schematic diagram illustrating a microchip of an emulsion generating part of the microsphere producing system according to the exemplary embodiment of the present invention and a flow formed inside the microchip.

Referring to FIG. 9, the microchip includes three micro flow paths (channel 1, channel 2, and channel 3 in the drawing). One of the micro flow paths becomes a passage through which the biodegradable polymer solution flows (flow 2), and the other two micro channels become passages through which the aqueous-phase solution flows (flow 1 and flow 3). The micro flow path for receiving the flow of the biodegradable polymer solution is positioned between the micro flow paths receiving the flow of the aqueous-phase solution. The micro flow path receiving the flow of the aqueous-phase solution merge with the micro flow path receiving the flow of the biodegradable polymer-phase solution at an angle Ψ at the merging point 15. Due to the interaction of the solutions flowing through the micro flow paths and the immiscibility of the solutions meeting at the merging point, biodegradable polymer-based microsphere droplets are formed at the merging point. The micro flow paths receiving the flow of the aqueous-phase solution include inlet passages 11 and 13, respectively, and through the inlet passages 11 and 13, the solution is introduced into the micro flow paths. The micro flow path receiving the flow of the biodegradable polymer-phase solution includes an inlet passage 12 and an outlet passage 14. The solution containing the biodegradable polymer-based microsphere droplets is discharged from the microchip via the outlet passage 14. The number of micro flow paths in the microchip for accommodating the flows of solutions may vary according to the required values for the final product. The solution containing the biodegradable polymer-based microsphere droplets will be referred to as a dispersed phase solution hereinafter.

In the present invention, the aqueous-phase solution is introduced into the microchip through the inlet passages 11 and 13, respectively, to form the flow 1 and the flow 3 in the micro flow paths 1 and 3, respectively, and meets the flow 2 of the biodegradable polymer-phase solution at the merging point 15 at a predetermined angle. Herein, by means of the aqueous-phase solution, that is, the flow 1 and the flow 3, the biodegradable polymer solution, that is, the flow 2, is segmented and the two solutions are immiscible, so that microsphere droplets are formed. Therefore, the dispersed phase solution is formed, and the microsphere droplets formed at the merging point 15 are discharged out of the microchip through the outlet passage 14.

When the emulsion is formed by using the microchip, the quality of the produced microspheres may be improved than that of the stirring method. However, in the case of continuous production using the microchips, there is a problem unfavorable to mass production due to the problem in that the microchip cannot be reused after a product is produced using a one batch process, and a new microchip needs to be used after disposal.

According to the exemplary embodiments of the present invention, the microsphere producing system includes the emulsion generating part which continuously forms the emulsion including the first raw material of the continuous phase and the second raw material of the dispersed phase, the first solvent extracting and removing part which accommodates the emulsion formed from the emulsion generating part and forms microspheres by extracting and removing the solvent from the dispersed phase of the emulsion, and the second solvent extracting and removing part which is spaced apart from the first solvent extracting and removing part, accommodates the emulsion formed from the emulsion generating part, and forms microspheres by extracting and removing the solvent from the dispersed phase of the emulsion, so that it is possible to maximize efficiency of the emulsion forming process and the solvent extracting and removing process, and mass-produce the high quality of microspheres at low cost.

In the meantime, in the exemplary embodiments of the present invention, although the case where the dispersed phase of the emulsion includes the oil-phase solution and the continuous phase includes the aqueous-phase solution has been described, the present invention is not limited thereto. The case where the dispersed phase of the emulsion includes an aqueous-phase solution and the continuous phase includes an oil-phase solution is also possible, and in this case, the drug contained in the microspheres may include a hydrophilic therapeutic agent.

Although the present invention has been described with reference to the above exemplary embodiments, it will be understood by those skilled in the art that various modifications and changes can be made to the present invention without departing from the spirit and scope of the present invention as set forth in the claims below.

What is claimed is:

1. A method of producing microspheres, the method comprising:
   preparing a first raw material and preparing a second raw material including a biodegradable polymer, a drug, and a solvent;
   providing the first raw material and the second raw material to an emulsion generating part and continuously forming, by the emulsion generating part, an emulsion including the first raw material of a continuous phase and the second raw material of a dispersed phase;
   supplying a firstly generated emulsion of the emulsion continuously formed in the emulsion generating part to a first solvent extracting and removing part and extracting and removing, by the first solvent extracting and removing part, the solvent from the dispersed phase of the firstly generated emulsion to form a microsphere; and
   supplying a secondly generated emulsion of the emulsion continuously formed in the emulsion generating part to a second solvent extracting and removing part which is spaced apart from the first solvent extracting and removing part and extracting and removing, by the second solvent extracting and removing part, the solvent from the dispersed phase of the secondly generated emulsion to form a microsphere,
   wherein the secondly generated emulsion is an emulsion generated in the emulsion generating part after the firstly generated emulsion is supplied to the first solvent extracting and removing part.

2. The method of claim 1, further comprising:
   cleaning and drying, or drying the microspheres formed in the first solvent extracting and removing part and obtaining dried microsphere powder.

3. The method of claim 2, further comprising:
   after recovering the microspheres formed in the first solvent extracting and removing part, supplying an emulsion newly generated in the emulsion generating part to the first solvent extracting and removing part and extracting and removing, by the first solvent extracting and removing part, the solvent from the second raw material of a dispersed phase of the newly generated emulsion to form a microsphere.

4. The method of claim 1, wherein the emulsion generating part includes a microchip including a first flow path in which the first raw material flows, a second flow path in which the second raw material flows, and a third flow path in which the emulsion including the continuous phase and the dispersed phase flows.

5. The method of claim 2, further comprising:
   cleaning, by a first cleaning part, the microsphere formed in the first solvent extracting and removing part; and
   cleaning, by a second cleaning part which is spaced apart from the first cleaning part, the microsphere formed in the second solvent extracting and removing part.

* * * * *